US012109992B2

(12) United States Patent
Gomes Filho et al.

(10) Patent No.: US 12,109,992 B2
(45) Date of Patent: Oct. 8, 2024

(54) BRAKING SYSTEM FOR A VEHICLE AND VEHICLE WITH A BRAKING SYSTEM OF THIS KIND

(71) Applicant: ZF Friedrichshafen AG, Friedrichshafen (DE)

(72) Inventors: Jonas Gomes Filho, Meckenbeuren (DE); Viktor Rakoczi, Immenstaad am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 200 days.

(21) Appl. No.: 18/008,224

(22) PCT Filed: May 4, 2021

(86) PCT No.: PCT/EP2021/061657
§ 371 (c)(1),
(2) Date: Dec. 5, 2022

(87) PCT Pub. No.: WO2021/244813
PCT Pub. Date: Dec. 9, 2021

(65) Prior Publication Data
US 2023/0202434 A1    Jun. 29, 2023

(30) Foreign Application Priority Data
Jun. 5, 2020   (DE) .................... 10 2020 207 076.8

(51) Int. Cl.
*B60T 7/12* (2006.01)
*B60T 7/22* (2006.01)

(52) U.S. Cl.
CPC .................. *B60T 7/22* (2013.01); *B60T 7/12* (2013.01); *B60T 2201/03* (2013.01)

(58) Field of Classification Search
CPC ........... B60T 7/22; B60T 2201/03; B60T 7/12
See application file for complete search history.

(56) References Cited

U.S. PATENT DOCUMENTS

2012/0053888 A1   3/2012  Stählin et al.
2019/0073543 A1*  3/2019  Ichinose ................ G06V 20/58
(Continued)

FOREIGN PATENT DOCUMENTS

DE   102013108000 A1   1/2014
DE   102017218329 A1   4/2019
(Continued)

OTHER PUBLICATIONS

International Search Report with English translation issued in PCT Application No. PCT/EP2021/061657 completed on Jul. 19, 2021 and mailed on Aug. 4, 2021 (4 pages).

(Continued)

*Primary Examiner* — Jacob M Amick
(74) *Attorney, Agent, or Firm* — Crowell & Moring LLP

(57) ABSTRACT

A braking system including a brake controller to control an actuating drive, a wireless communication unit to receive external data from an external device, an online receiver to receive vehicle data from devices within the vehicle and a portion of the external data and to identify a situation requiring braking as online information, a first offline receiver to receive at the vehicle data from the devices and to identify the situation requiring braking as first offline information, a second offline receiver including sensors to record traffic data and configured to identify the situation requiring braking as second offline information from the traffic data, and a comparator to compare the online information and the first and second offline information and generate a positive or negative result on the basis of the comparison, and transmit a positive result to the brake controller in order to activate the brake controller.

15 Claims, 3 Drawing Sheets

(56) References Cited

U.S. PATENT DOCUMENTS

| | | |
|---|---|---|
| 2020/0238950 A1 | 7/2020 | Knobloch |
| 2021/0197799 A1 | 7/2021 | Ross |
| 2024/0001924 A1* | 1/2024 | Giovanardi .......... B60G 17/016 |

FOREIGN PATENT DOCUMENTS

| | | |
|---|---|---|
| DE | 102017218438 A1 | 4/2019 |
| GB | 2506479 A | 4/2014 |

OTHER PUBLICATIONS

Written Opinion issued in corresponding PCT Application No. PCT/EP2021/061657 completed on Jul. 19, 2021 (6 pages).

* cited by examiner

BRAKING SYSTEM FOR A VEHICLE AND VEHICLE WITH A BRAKING SYSTEM OF THIS KIND

CROSS-REFERENCE TO RELATED APPLICATIONS

This application is a U.S. national stage application under 35 U.S.C. § 371 of PCT Application No. PCT/EP2021/061657, filed on May 4, 2021, and published as WO 2021/244813 A, on Dec. 9, 2021, which claims priority from German Application No. DE 10 2020 207 076.8, filed on Jun. 5, 2020, the entirety of which are each hereby fully incorporated by reference herein.

The invention relates to a braking system for a vehicle and a vehicle that has such a braking system.

Vehicles contain various processors that generate commands for controlling various modules in the vehicle such as an infotainment system, electric motor, drive battery, suspension control, brakes, gear ratios, air conditioning, etc. on the basis of sensor data and actuator data. The processors also receive commands for controlling or operating modules in the vehicle such as infotainment systems and navigators on the basis of external data.

Modern driver assistance systems are capable of completely preventing or at least minimizing an upcoming collision by initiating an autonomous braking procedure. These systems use sensor systems (radar, lidar, image processing) to scan the vehicle's environment, and are able to determine potential collisions with objects in the environment by evaluating vehicle-to-vehicle communication (V2V) or vehicle-to-everything communication (V2X).

For this, vehicles are increasingly connected to communication networks. The emergence of V2V communication and V2X communication via radio waves and the development of the internet of things has opened up a large number of possibilities.

It presents the possibility of connecting external terminals to the main controllers, such as SoCs (Systems on a Chip) and other components within the electronic control unit (ECU).

These systems are usually protected with firewalls or other security systems, in order to prevent malware from being installed.

As such, data can be authenticated in order to validate the source and/or content of the file prior to its execution.

Furthermore, it is possible to only exchange encrypted data, which are encrypted and decrypted with a public key and a private key, for example.

DE 10 2017 218 329 A1 discloses a method for controlling access to a function of a device requiring authentication, in particular a vehicle by means of a smart device such as a smartphone, in which an authentication feature of the smart device is compared with an authentication feature stored in the device, such that when an identity is authenticated, or there is sufficient correlation between the features, the authentication is subjected to an approval by the user of the smart device, in which it is determined whether or not the user agrees with the authentication, in which the agreement process contains at least one channel in a protected domain of the smart device, and/or is embedded in this protected domain, which is outside a domain in the operating system, the software, and/or the apps in the smart device, and the function of the device is performed when both an authentication and an agreement are obtained.

Clever hackers are able to circumvent many security measures, however.

This results in an increased risk of downloading and installing malicious software commands into the control modules. Examples of these attacks are those that reprogram the vehicle electronics systems and control modules, or manipulate vehicle components, etc., which can result in undesired and dangerous behavior of the vehicle's systems.

This is particularly dangerous with regard to controlling brakes. If the braking system has been infected with malware, the brakes may be activated unnecessarily.

The object of the invention is therefore to increase the reliability of a braking system in a vehicle, to thus prevent dangerous activation and deactivation of the braking system by external interventions or malware.

This problem is solved by a braking system that has the features of claim 1, and a vehicle that has the features of claim 15.

Preferred developments of the invention are described in the dependent claims, which can be combined with one another appropriately.

The object is achieved with a braking system for a vehicle that contains a brake controller configured to control an actuating drive that controls the braking force, a wireless communication device that is configured to receive external data from an external device, and an online receiver that is configured to receive vehicle data from one or more devices within the vehicle via one or more first input channels as well as at least a part of the external data via the wireless communication unit, wherein the online receiver is also configured to identify a situation requiring braking as online information from the external data and vehicle data that has been received, and a first offline receiver that is configured to receive at least part of the same vehicle data from one or more devices within the vehicle via one or more second input channels, and identify the situation requiring braking as first offline data from the vehicle data that has been received, and at least one second offline receiver that comprises one or more sensors that are placed such that they can at least record traffic in the direction of travel as traffic data, wherein the at least one second offline receiver is configured to identify the situation requiring braking as second offline data from the traffic data that has been received, and a comparator that is configured to compare the online data and the first and second offline data and generate a positive or negative result on the basis thereof, and to send a positive result to the brake controller in order to activate the brakes.

Devices within the vehicle can be vehicle sensors and/or actuators, for example, that are placed directly in or on the vehicle in order to generate sensor data or command data.

An online receiver is coupled to the external devices such as V2V or V2X communication systems. This coupling takes place via the wireless communication unit. In particular, it is in the form of a wireless interface.

It has been realized in accordance with the invention that increased caution must be taken with braking systems in particular with regard to hackers, who could take control of the braking system. Airplanes in particular have been subject to hacker attacks.

V2X/V2V systems are normally protected against malicious behavior by various resources such as firewalls and other state of the art software protection mechanisms. Nevertheless, every system that is connected to a network may be vulnerable to new hacker innovations.

In the case of a braking system, hackers could install malware, and even take complete control of the braking system. This could result in life threatening traffic accidents for drivers and other road users.

The inventive combination of the online receiver and first and second offline receivers, in which the second offline receiver records traffic in the direction of travel, with the comparison by the comparator, results in greater security with regard to external attacks. Obstacles in the vehicle's path can be reliably detected with the invention, such that a situation requiring braking is identified to prevent a collision with the obstacle by the vehicle.

The brake controller is only activated according to the invention if the comparator generates a positive result on the basis of the comparison. A positive result is obtained, for example, if a situation requiring braking is identified by at least two of the receivers comprising the online receiver, the first offline receiver, and the second offline receiver. If the result is negative, the brake controller can preferably be deactivated. The result is negative if the situation requiring braking is only identified by one of the receivers.

This results in a high level of reliability with regard to the identification of a braking situation or emergency situation. Consequently, the brake controller is only activated in the event of a positive result. This also enables the recognition of imposter data, such as "oncoming vehicle, emergency braking," such that an emergency braking procedure on the basis of imposter data can be prevented.

In best case scenarios (or in normal conditions), all of the information is identical. In this case, the information, "pedestrian in the road, full braking," etc. generated by the online receiver on the basis of the vehicle data and the external data, is validated by the information, "pedestrian in the road, full braking," generated by the first offline receiver on the basis of only the vehicle data, and confirmed by the at least one second offline receiver on the basis of only the recorded and evaluated traffic conditions in the direction of travel.

As a result, both an erroneous identification of a situation requiring braking and a resulting emergency braking, which could lead to a hazardous traffic situation, can therefore be prevented by the braking system according to the invention, and any malfunctioning caused by malware can also be prevented.

It is also known to be the case that emergency braking systems that only rely on a camera are frequently unreliable because the camera only records two dimensional images. Particularly in the case where the brakes are fully engaged, this must be reliably detected for the protection of other road users. Consequently, not only is erroneous information that leads to unnecessary emergency braking detected with the invention, but incorrect evaluations that could also result in unnecessary emergency braking are identified as well.

As a result of the design of the braking system according to the invention, the at least one second offline receiver does not need to satisfy an ASIL (Automotive Safety Integrity Level) requirement, because the at least one second offline receiver is only used to validate the information that has been identified. This means that less expensive sensors, such as those with a lower resolution, can be used.

Furthermore, useful data can be made available to the braking system through the recording of certain traffic situations by the second offline receiver for plausibility checks, referred to herein as validation.

The braking system according to the invention therefore ensures a diversity as well as the independence in the three inputs to the comparator by the different receivers. As such, the two offline receivers must first be physically removed before they can be manipulated.

All of the vehicle data are preferably received by the online receiver and the first offline receiver. This allows the first offline receiver to reliably identify the same situations requiring braking.

The first offline receiver is preferably designed as a less complex component than the online receiver. This results in savings with regard to production costs.

Furthermore, the online receiver and the wireless communication unit can be placed on a single component, or designed as an integral component. The comparator preferably sends a negative result to the brake controller in order to deactivate it.

The comparator is preferably configured to generate a positive result if the situation requiring braking is obtained as data at least twice, by the online receiver and/or the first offline receiver and/or the second offline receiver. This ensures the reliability or validation of the identification of a situation requiring braking. The comparator is also configured to send the positive result to the braking system in order to activate it. This results in an activation of the braking system in accordance with the positive information (fully engaged brakes/braking).

In a preferred embodiment, the online receiver is configured to only take external data into account that exhibit a temporal validity in identifying a situation requiring braking. This means that only that external data from a V2X/V2V communication system (external device) that have a temporal validity are taken into account, i.e. a foreign uploading of an (imposter) object that appears spontaneously in front of the vehicle, is identified as imposter or sabotaged information.

This means that only external data exhibiting temporal validity can be taken into account as valid data. The temporal validity is a value of a few (milli) seconds, for example, which can be determined arbitrarily.

In a preferred embodiment, the online receiver is configured to only take into account external data that exhibit a minimum distance to a calculated collision location when the danger of a collision has been identified as a situation requiring braking. This prevents emergency braking due to imposter external data (malware). As a result, situations involving pedestrians that spontaneously appear in the external data directly in front of the vehicle are not taken into account.

In another preferred embodiment, the online receiver is configured to only take into account external data that contain a directional vector. This means that the signal that has been obtained, i.e. the external data, must contain a "vector" indicating at least the direction from which it has come, because every object with which the vehicle could collide must have come from somewhere. This forms another means by which imposter external data can be identified.

Furthermore, the one or more devices within the vehicle are connected to the online receiver as well as the first offline receiver such that all vehicle data is transmitted identically. This ensures that the all of the information generated exclusively by the vehicle or its sensors is provided in the same manner.

The first input channel and second input channel are preferably separated from one another. This increases the security.

The comparator is preferably configured to generate a negative result if the situation requiring braking is only identified once as information in the online receiver or in the first offline receiver, or in the at least one second offline receiver. A warning is preferably issued to the driver in the case of a negative result. As a result, it is possible to determine if there is either a security issue (hacker attack), or one of the vehicle systems (vehicle sensors) for obtaining vehicle data/traffic data is defective. The warning provides the driver with greater awareness of the current situation.

The wireless communication unit is also preferably designed for vehicle-to-vehicle (V2V) or vehicle-to-everything (V2X) communication. This simplifies reception of external data. This wireless communication unit is preferably configured for bidirectional communication. This can support autonomous operation.

The one or more sensors in the second offline receiver also preferably comprise at least one imaging sensor. This can be a dashcam, a mobile end device, or another camera. Such a mobile end device can exhibit an aperture angle of up to 120°, a high capture rate of up to 60 fps, and a resolution of 12 megapixels, such that traffic events can be recorded at a higher resolution and over a large area.

The brake controller is preferably configured to perform the necessary braking with the actuating drive in the event of a positive result.

These cameras are very powerful and preferably have a driver assistance application with voice output or image output to the driver. They also have a human-machine interface in the form of a display or speaker. The at least one second offline receiver is located directly behind the windscreen or on the dashboard, and can therefore easily record traffic events in the direction of travel.

The online receiver and the first offline receiver are preferably equipped with an artificial learning system, e.g. an artificial neural network, in order to make use of the identification of a situation requiring braking as information. The methods involving artificial intelligence can also be used for identifying situations requiring braking in the traffic data from the second offline receiver, usually in the form of images from an imaging sensor.

There is also a display that is located in the vehicle such that it can be seen by at least the driver, on which the braking system is configured to show a positive result in the form of information. Alternatively, the comparator can also be configured to show this situation requiring braking on the display. This allows the vehicle occupants, in particular the driver, to prepare for this (emergency) braking.

The comparator is also preferably configured to weight differently and compare the online information identified as a situation requiring braking received by the online receiver, and the first offline information identified as a situation requiring braking received by the first offline receiver, and the second offline information identified as a situation requiring braking received by the at least one second offline receiver, and to generate a positive or negative result on the basis of the weighted comparison. A confidence interval can thus be formed, for example, and a positive or negative result can be generated on the basis of this confidence interval.

In another preferred embodiment, there is at least one more offline receiver, which is configured to receive other data from other vehicle sensors on or in the vehicle, and to identify the situation requiring braking as further offline information from the other data that have been received, and to transmit this to the comparator, which is then configured to compare the online information and the first offline information and the second offline information as well as the other offline information, and to generate a positive or negative result on the basis of this comparison. These types of other offline receivers can be imaging sensors, for example, which scan the environment on either side of the vehicle. This makes it possible to obtain better observations of the traffic environment in the direction of travel. The other offline receiver can also make use of other sensors (lidar, radar, etc.). The information generated in these other offline receivers can be sent to the comparator, for example, and weighted therein, or it can be weighted prior to being sent thereto. A positive or negative result can be reliably generated on the basis of all of the information from all of the offline receivers and the online receiver.

The online receiver is also preferably configured to independently evaluate all of the vehicle data and external data that have been received. In this case, the first offline receiver is preferably configured to independently evaluate all of the vehicle data it receives, and the at least one second offline receiver is also configured to independently evaluate the traffic data it receives. This also contributes to the prevention of a spreading of malware and erroneous information associated therewith.

The first offline receiver and the online receiver are preferably placed on the same mounting plate, in particular a semiconductor substrate. This eliminates the need for any additional installation space. In this case, the traffic data can be evaluated in the second offline receiver. Alternatively, the online receiver and the first offline receiver and an evaluation unit for the second offline receiver can be placed on the same mounting plate, in particular a semiconductor substrate.

The object of the invention is also achieved by a vehicle that has the braking system described above, in which the vehicle is designed for autonomous operation. The vehicle then has sensors such as lidar, radar, camera, and ultrasonic sensors for the autonomous operation in this case, which can be used for generating the vehicle data and the traffic data.

Further properties and advantages of the invention can be derived from the following detailed description in reference to the drawings, which are given below as non-limiting examples. In the drawings.

Figure 1:
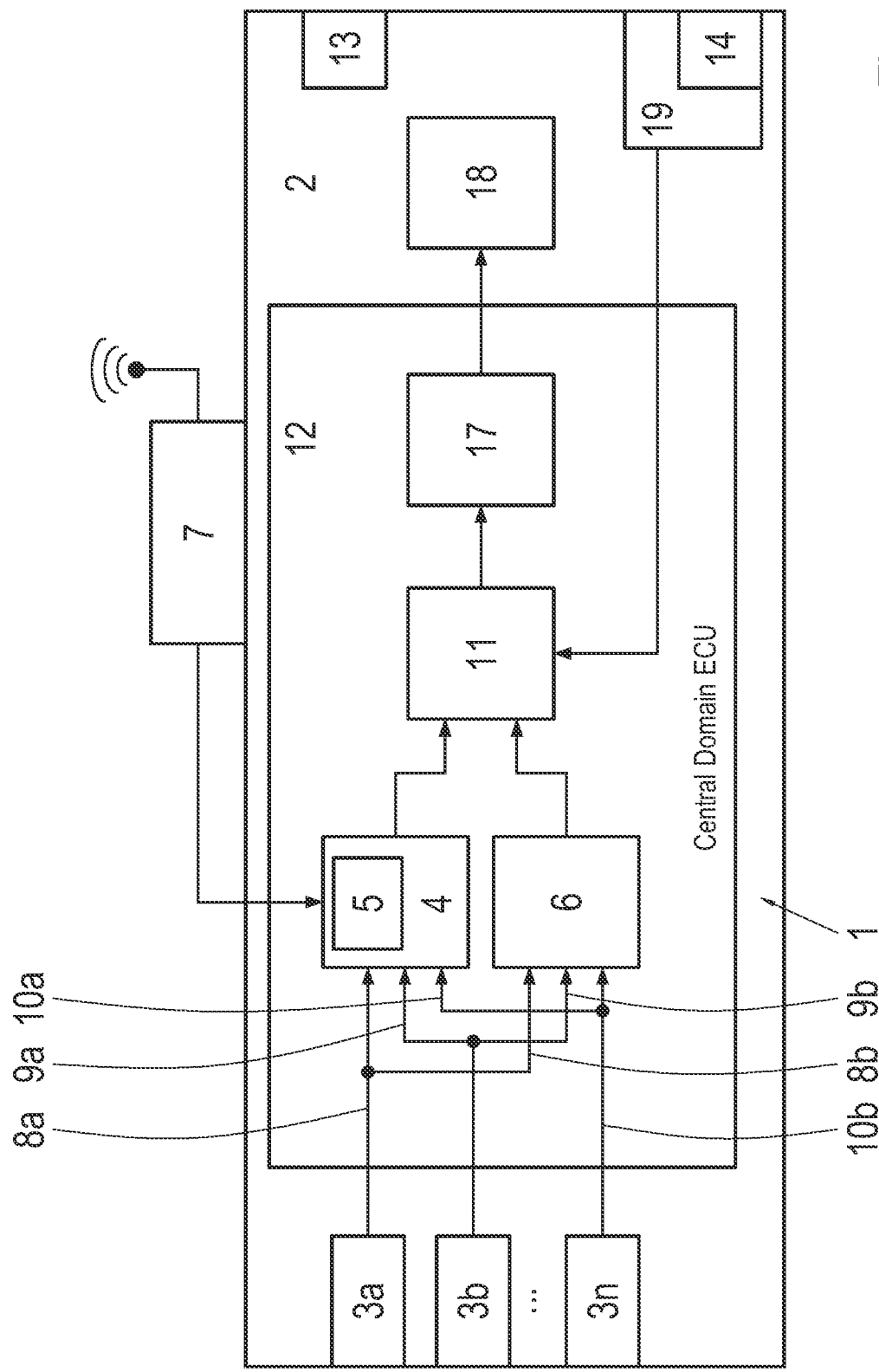
FIG. 1 shows a schematic illustration of a first embodiment of the braking system according to the invention.

FIG. 1 shows a schematic illustration of a vehicle 2 with a first embodiment of a braking system 1 according to the invention. The vehicle 2 has an actuating drive 18 that controls the braking force to thus obtain different braking forces. This can be an engine brake force actuating drive for altering an engine brake force or a wheel brake force actuating drive for exerting a braking force on the wheels. These actuating drives normally contain actuators. There is also a brake controller 17 that controls the braking force of the actuating drive 18 on the basis of various vehicle data.

There is also a wireless communication unit 5 configured to receive external data through V2V (vehicle-to-vehicle) or V2X (vehicle-to-everything) communication 7. The wireless communication unit 5 can be designed as a radio connection, for example.

Vehicles can communicate among themselves with a V2V/V2X connection 7, in order to exchange their precise locations, speeds, and directions of travel, for example. This increases traffic safety.

External data comprise GPS data, for example, or control data, as well as data regarding other vehicles, etc.

The braking system 1 contains an online receiver 4, for receiving vehicle data from one or more on-board vehicle sensors 3a, 3b, . . . 3n, or actuators, via one or more first input channels 8a, 9a, 10a, as well as the external data via the wireless communication unit 5. If there is a situation requiring braking, it is identified as online information with these on-board vehicle sensors 3a, 3b, . . . , 3n or actuators and on the basis of the external data.

The vehicle data is transmitted via the first input channels 8a, 9a, 10a to the online receiver 4.

Such a braking situation can be identified as, "attention, object detected at 10 meters; emergency braking."

The braking system 1 has a first offline receiver 6 that is configured to receive preferably identical vehicle data from the one or more on-board vehicle sensors 3a, 3b, . . . , 3n or actuators via one or more second input channels 8b, 9b, 10b. The first offline receiver 6 is also configured to identify the same situation requiring braking from the vehicle data that it receives as first offline information, if there is such a situation.

This means that the first offline receiver 6 receives the same vehicle data as the online receiver 4, except for the external data. The vehicle data is transmitted to the first offline receiver 6 via the second input channels 8b, 9b, 10b. The first input channels 8a, 9a, 10a and the second input channels 8b, 9b, 10b are preferably separated from one another.

The first input channels 8a, 9a, 10a and the second input channels 8b, 9b, 10b can be hard wired or wireless.

As such, the online receiver 4 receives the vehicle data and the external data, and the offline receiver 6 receives the vehicle data independently thereof.

In normal operation, i.e. when none of the vehicle sensors/ actuators 3a, 3b, . . . , 3n are malfunctioning, the first offline receiver 6 and the online receiver 4 identify the same information, e.g. "attention, object detected at 10 meters, brake," if there is such a braking situation.

The braking system 1 has at least one second offline receiver 19, which comprises one or more imaging sensors 14, in particular cameras, which are placed on the front of the vehicle 2 such that they at least record traffic in the direction of travel as traffic data.

The camera can be a modern mobile end device or a dashcam, for example. These are very powerful and have a human-machine interface in the form of a display or speaker. The imaging sensor 14 can be designed as a driver assistance application with speech output or image output to the driver. The imaging sensor 14, e.g. the dashcam, is preferably located behind the windshield on the vehicle 2, or on a dashboard, and records the traffic in the direction of travel. These cameras can have an aperture angle of up to 120°, with a higher capture rate, e.g. 60 fps, and a resolution of 12 megapixels, such that the traffic in the direction of travel can be recorded at a high quality. The at least one second offline receiver 19 is configured to identify a situation requiring braking as second offline information from the traffic data that has been received.

There is also a comparator 11 that is configured to compare the online information and the first and second offline information with one another, in order to determine if the situation requiring braking has been identified in each of the receivers 4, 6, 19. A positive or negative result is generated on the basis of the comparison.

A positive result is then generated by the comparator 11 if at least two of the receivers 4, 6, 19 have identified the same situation requiring braking.

In this case, the same situation would be identified as, "pedestrian detected at 10 meters, braking required." This means that there is then a positive result if the situation requiring braking has been identified by two of the receivers 4, 6, 19. It should be noted that a positive result can also be generated with different settings in the comparator 11.

Normally, i.e. when there is no malware or malfunctioning of the vehicle sensors/actuators 3a, 3b, . . . , 3n and imaging sensors 14, all of the information, i.e. the online information identifying a situation requiring braking and the first and second offline information, is identical. This means that all of the receivers 4, 6, 19 have identified the same braking situation.

If there is a positive result, a brake controller 17 is activated, which controls the actuating drive 18 in accordance with the identified braking situation. Alternatively, the positive result can be generated in another manner. The offline and online information identifying the situation requiring braking can be weighted in the comparator 11, for example, or a positive result is only generated if the at least one second offline receiver 19 has identified the situation requiring braking as second offline information, as well as one of the other two receivers 4, 6.

The brake controller 17 is then activated if the comparator 11 has a positive result, such that the necessary braking (emergency braking) can take place in accordance with the vehicle data.

A deactivation can also take place if the comparator 11 generates a negative result. This may be the case, for example, if the situation requiring braking is only identified in one of the receivers 4, 6, 19, e.g. just the online receiver 4. The brake controller 17 is then deactivated, such that no braking takes place.

An emergency braking is prevented by the braking system 1 according to the invention if it is not necessary. This makes it impossible for hackers to upload malware or imposter data into the on-board network in a vehicle 2 for the purpose of simulating an object in the direction of travel, for example. Unnecessary braking can be prevented in this manner. This is one means of preventing hazardous traffic situations.

There is also a display 13, located in the vehicle 2 such that it can at least be seen by the driver, e.g. in the dashboard. If a situation requiring braking is identified, this is shown in the display 13.

With a negative result, a warning can also be shown in the display 13, or a warning sound can be issued from the speaker (not shown).

Figure 2:
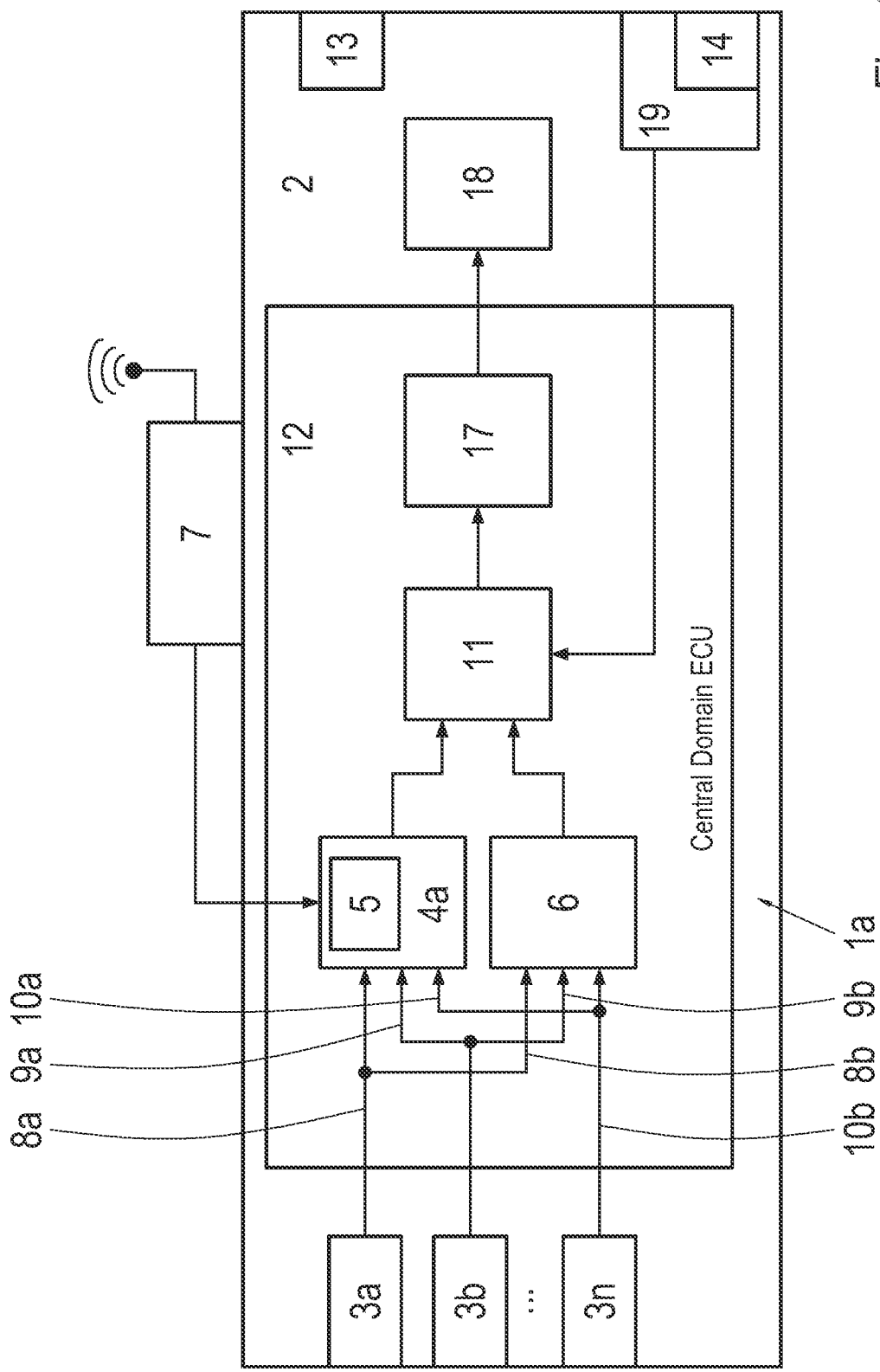
FIG. 2 shows a schematic illustration of a second embodiment of the braking system according to the invention.

FIG. 2 shows a schematic illustration of a vehicle 2 with a second embodiment of the braking system 1a according to the invention.

The vehicle 2 contains the actuating drive 18 that controls the braking force such that the different forces can be applied to the brakes. The brake controller 17 is also present, which controls the braking force of the actuating drive 18 on the basis of various vehicle data.

The wireless communication unit 5 is also present, which is configured to receive external data through V2V (vehicle-to-vehicle) or V2X (vehicle-to-everything) communication 7.

The braking system 1a contains an online receiver 4a, for receiving vehicle data from one or more on-board vehicle sensors 3a, 3b, . . . 3n, or actuators, via one or more first input channels 8a, 9a, 10a, as well as the external data via the wireless communication unit 5. If there is a situation requiring braking, it is identified as online information with these on-board vehicle sensors 3a, 3b, . . . , 3n or actuators and on the basis of the external data.

The vehicle data is transmitted via the first input channels 8a, 9a, 10a to the online receiver 4a.

The online receiver 4a is configured to only take into account external data that have a temporal validity in identifying a situation requiring braking.

This means that only the external data that has been transmitted to the vehicle 2 by the V2X/V2V communication 7 that has a temporal validity is used by the online receiver 4a, i.e. any foreign uploading of an (imposter) object that appears spontaneously immediately in front of the vehicle 2 is thus identified as imposter or sabotage information. The temporal validity can be set arbitrarily, for example, as a value in seconds or milliseconds.

The online receiver 4a is also configured to only take into account external data that contains a directional vector. This is because any object that could collide with the vehicle must come from somewhere, i.e. it must be travelling in a direction toward the vehicle 2. If the object that is about to collide with the vehicle does not exhibit a directional vector, it is then identified as imposter external data (from malware).

The online receiver 4a is also configured to only take into account external data that are at a minimum distance to the calculated location of the collision if the danger of a collision has been identified as a situation requiring braking. This prevents emergency braking due to imposter external data (from malware).

As a result, situations such as pedestrians that do not actually exist, but suddenly appear in the external data directly in front of the vehicle 2, are not taken into account. Consequently, the location of the potential collision must be at least a minimum distance to the vehicle 2, depending on the speed.

The braking system 1a also has the first offline receiver 6, which is preferably configured to receive the same vehicle data from the one or more on-board vehicle sensors 3a, 3b, . . . , 3n or actuators via one or more second input channels 8b, 9b, 10b. The braking system 1a is also configured to identify the same situation requiring braking from the vehicle data it receives as first offline information, if there is such a situation.

In normal operation, i.e. when none of the sensors/actuators 3a, 3b, . . . , 3n are malfunctioning, the first offline receiver 6 and the online receiver 4a generate identical information, such as, "attention, object identified at 10 meters, brake," if there is such a braking situation.

The braking system 1a contains the second offline receiver 19, which comprises one or more imaging sensors 14, in particular cameras, which are positioned to record at least the traffic in the direction of travel as traffic data.

In normal operation, i.e. when none of the vehicle sensors 3a, 3b, . . . , 3n are malfunctioning, the first offline receiver 6 and the online receiver 4a, as well as the second offline receiver 19, generate identical information, such as, "attention, objected identified at 10 meters, brake," if there is such a braking situation.

There is also the comparator 11, which is configured to compare the online information and the first and second offline information, i.e. to determine whether the braking situation has been identified in the individual receivers 4a, 6, 19. A positive or negative result is generated on the basis of the comparison.

The same braking situation, "pedestrian identified at 10 meters, braking necessary," is identified here, for example. This means there is a positive result if the situation requiring braking has been identified by two of the receivers 4a, 6, 19. It should be noted that a positive result can also be generated if there are other settings in the comparator 11.

If there is a positive result, a brake controller 17 is activated, which controls the actuating drive 18 according to the identified braking situation.

The online receiver 4a and the first offline receiver 6 are placed on the same mounting plate 12, in particular a semiconductor substrate. This eliminates the need for additional installation space. An evaluating unit (not shown) for the second offline receiver 19 can also be placed on the mounting plate 12, such that only the imaging sensor 14 for the second offline receiver 19, for recording traffic in the direction of travel, is placed on the vehicle 2.

Figure 3:
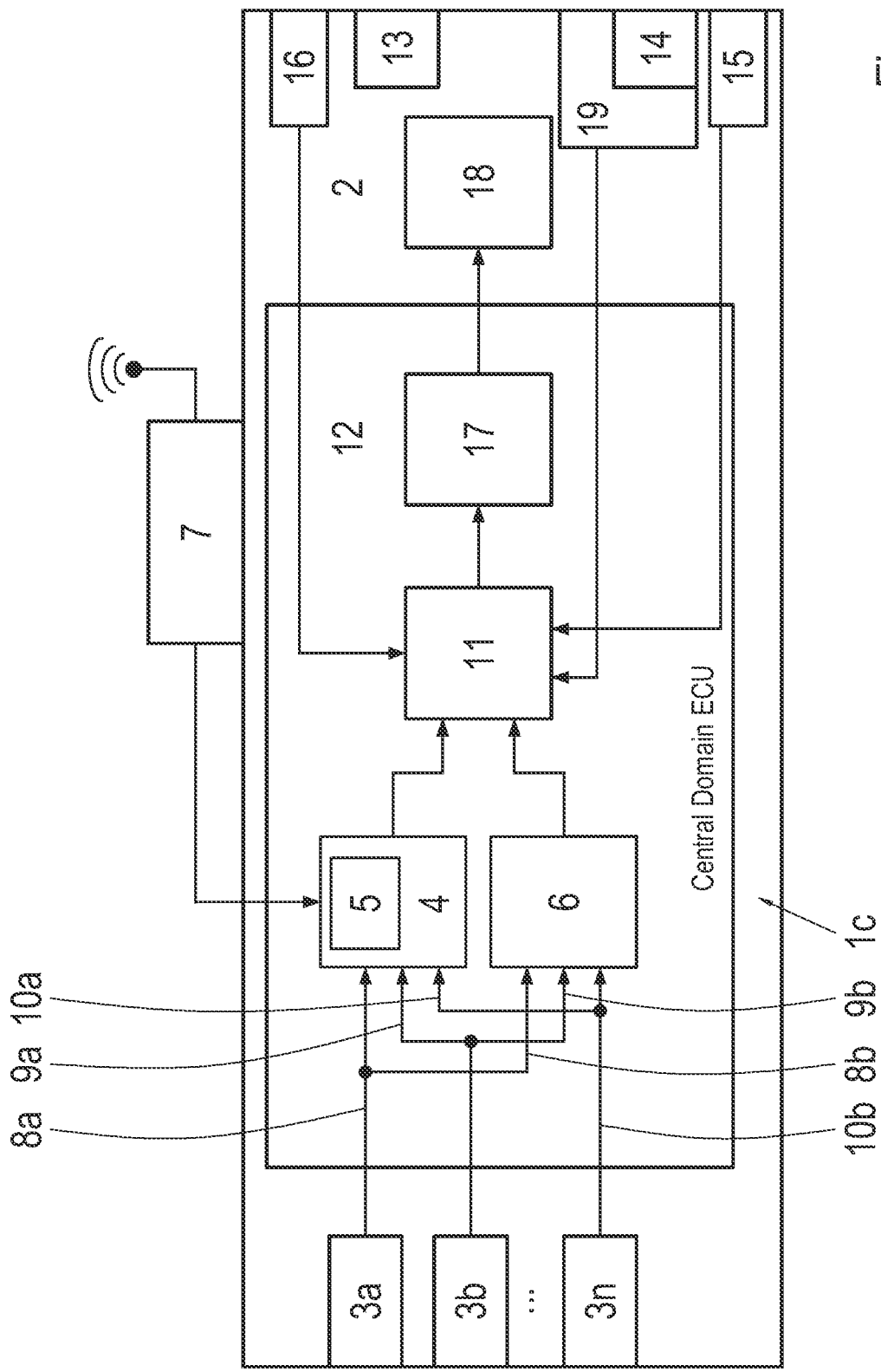
FIG. 3 shows a schematic illustration of a third embodiment of the braking system according to the invention.

FIG. 3 shows a schematic illustration of a vehicle 2 that has a third embodiment of the braking system 1b according to the invention.

The vehicle 2 contains the actuating drive 18 and the brake controller 17. The braking system 1b also contains the wireless communication unit 5. The braking system 1b contains the online receiver 4, for receiving vehicle data from one or more on-board vehicle sensors 3a, 3b, . . . , 3n or actuators via one or more input channels 8a, 9a, 10a, as well as the external data via the wireless communication unit 5.

The braking system 1b also contains the first offline receiver 6, which is configured to preferably receive the same vehicle data from the one or more on-board vehicle sensors 3a, 3b, . . . , 3n or actuators via one or more second input channels 8b, 9b, b.

The braking system 1b contains the at least one second offline receiver 19, which comprises one or more imaging sensors 14, in particular cameras, which are positioned to record at least the traffic in the direction of travel as traffic data.

The braking system 1b contains a third offline receiver 15 and a fourth offline receiver 16, which each have at least one imaging sensor (not shown) for recording images of the traffic to the side and in the direction of travel as traffic data. The situation requiring braking can also be identified from this traffic data by the third offline receiver 15 and fourth offline receiver 16 as third and fourth offline information.

There is also the comparator 11, which is configured to compare the online information and the first, second, third, and fourth offline information, i.e. to determine whether the situation requiring braking has been identified in the individual receivers 4, 6, 19, 15, and 16. A positive or negative result is generated on the basis of the comparison. The weighting of the individual data can contribute to obtaining a positive result in the comparator 11.

If there is a positive result, the brake controller 17 is activated, which controls the actuating drive 18 in accordance with the identified braking situation.

REFERENCE SYMBOLS 1, 1a, 1b braking system
2 vehicle
3a, 3b, 3n vehicle sensors
4, 4a online receiver
5 communication unit
6 first offline receiver
7 communication
8a first input signal
8b second input signal
9a first input signal
9b second input signal
10a first input signal
10b second input signal
12 mounting plate 13 display
14 imaging sensor
15 third offline receiver
16 fourth offline receiver
17 brake controller
18 actuating drive (brakes)

The invention claimed is:

1. A braking system for a vehicle, comprising:
a brake controller is configured to control an actuating drive that controls a braking force;
a wireless communication unit configured to receive external data from an external device;
an online receiver configured to:
receive vehicle data from one or more devices within the vehicle via one or more first input channels and at least a portion of the external data via the wireless communication unit; and
identify a situation requiring braking as online information from the external data and vehicle data received by the online receiver;
a first offline receiver configured to:
receive at least a portion of the vehicle data from the one or more devices within the vehicle via one or more second input channels; and
identify the situation requiring braking as first offline information from the vehicle data received by the first offline receiver; and
at least one second offline receiver comprising one or more sensors that are placed such that they can at least record traffic in a direction of travel as traffic data, and wherein the at least one second offline receiver is configured to identify the situation requiring braking as second offline information from the traffic data received by the at least one second offline receiver; and
a comparator configured to:
compare the online information, the first offline information, and the second offline information;
generate a positive or negative result on a basis of the comparison; and
transmit the positive result to the brake controller in order to activate the brake controller in response to generating the positive result.

2. The braking system according to claim 1, wherein the comparator is configured to:
generate the positive result in response to at least two of the following occurring:
the situation requiring braking being identified as the online information in the online receiver,
the situation requiring braking being identified as the first offline information in the first offline receiver, and/or
the situation requiring braking being identified as the second offline information in the at least one second offline receiver.

3. The braking system according to claim 1, wherein the online receiver is configured to take into account only external data that have a temporal validity when identifying the situation requiring braking as online information.

4. The braking system according to claim 1, wherein the online receiver is configured to take into account only external data that contain a directional vector when identifying the situation requiring braking as online information.

5. The braking system according to claim 1, wherein the one or more devices within the vehicle are connected to the online receiver and to the first offline receiver for an identical transmission of the vehicle data.

6. The braking system according to claim 1, wherein the first input channels and second input channels are separated from one another.

7. The braking system according to claim 1, wherein the comparator is configured to:
generate the negative result in response to one or less of the following occurring:
the situation requiring braking being identified as online information in the online receiver;
the situation requiring braking being identified as the first offline information in the first offline receiver; or
the situation requiring braking being identified as the second offline information in the at least one second offline receiver; and issue a warning in response to generating the negative result.

8. The braking system according to claim 1, wherein the wireless communication unit is equipped for vehicle-to-vehicle or vehicle-to-everything communication.

9. The braking system according to claim 1, wherein the one or more sensors for the offline receiver comprise at least one imaging sensor.

10. The braking system according to claim 1, wherein the brake controller is configured to control the actuating drive to control the braking force in response to the positive result.

11. The braking system according to claim 1, further comprising a display placed such that it can be seen by at least a driver,
wherein the braking system is configured to show the positive result as information on the display.

12. The braking system according to claim 1, wherein the comparator is configured to:
compare and weight differently the online information received from the online receiver, the first offline information received from the first offline receiver, and the second offline information received from the at least one second offline receiver; and
generate the positive or negative result on a basis of the weighted comparison.

13. The braking system according to claim 1, further comprising:
at least one additional offline receiver configured to identify the situation requiring braking as further offline information and send it to the comparator,
wherein the comparator is configured to compare the online information, the first offline information, the second offline information, and the further offline information and generate the positive or negative result on a basis of the comparison.

14. The braking system according to claim 1, wherein the online receiver is configured to evaluate all of the vehicle data and external data it receives itself,
wherein the first offline receiver is configured to evaluate all of the vehicle data it receives, and
wherein the at least one second offline receiver is configured to evaluate the traffic data.

15. A vehicle comprising the braking system according to claim 1, wherein the vehicle is configured to perform autonomous operation.

* * * * *